(12) United States Patent
Visenzi

(10) Patent No.: US 8,919,624 B2
(45) Date of Patent: Dec. 30, 2014

(54) FIXING SYSTEM FOR CARRIER BAGS FOR MOTORCYCLES

(75) Inventor: Giuseppe Visenzi, Brescia (IT)

(73) Assignee: Givi S.R.L. Unipersonale, Flero (IT)

( * ) Notice: Subject to any disclaimer, the term of this patent is extended or adjusted under 35 U.S.C. 154(b) by 278 days.

(21) Appl. No.: 13/578,366

(22) PCT Filed: Feb. 7, 2011

(86) PCT No.: PCT/IB2011/000233
§ 371 (c)(1),
(2), (4) Date: Nov. 5, 2012

(87) PCT Pub. No.: WO2011/098893
PCT Pub. Date: Aug. 18, 2011

(65) Prior Publication Data
US 2013/0037588 A1    Feb. 14, 2013

(30) Foreign Application Priority Data
Feb. 10, 2010   (IT) .............................. MI2010A0199

(51) Int. Cl.
*B62J 9/00* (2006.01)
*F16B 21/18* (2006.01)

(52) U.S. Cl.
CPC . *F16B 21/18* (2013.01); *B62J 9/008* (2013.01)
USPC ...... 224/413; 248/225.21; 403/325; 403/326; 403/357

(58) Field of Classification Search
CPC ........ B62J 9/008; F16B 21/18; F16B 21/183; F16B 21/186
USPC ................... 224/413; 403/325–326, 335–336, 403/348–351, 353, 355, 357, 408.1; 248/215, 225.21, 339
See application file for complete search history.

(56) References Cited

U.S. PATENT DOCUMENTS

| | | | |
|---|---|---|---|
| 6,862,952 B2 * | 3/2005 | Aeberhard ................. | 74/606 R |
| 6,974,059 B2 * | 12/2005 | Alderman .................... | 224/413 |
| 7,182,359 B2 * | 2/2007 | Galvagno .................. | 280/288.4 |
| 7,226,233 B2 * | 6/2007 | SuBenbach et al. .......... | 403/143 |
| 2006/0118585 A1 * | 6/2006 | Ognissanti et al. ........... | 224/413 |

FOREIGN PATENT DOCUMENTS

| | | |
|---|---|---|
| EP | 1255069 | 11/2002 |
| GB | 2009358 | 6/1979 |
| WO | 2004/076269 | 9/2004 |
| WO | WO 2008078439 A1 * | 7/2008 |

* cited by examiner

*Primary Examiner* — Justin Larson
*Assistant Examiner* — Scott McNurlen
(74) *Attorney, Agent, or Firm* — Jacobson Holman Hershkovitz, PLLC.

(57) ABSTRACT

A system is described for hooking and unhooking a carrier bag with respect to the tank of a motorcycle. The system comprises a first group of components suitable to be fixed to the carrier bag and a second group of components suitable to be fixed to the tank. The first group of components comprises a flexible ring provided with a plurality of locking teeth elastically projecting inwards of such a flexible ring. The locking teeth are coupled with an annular flange of the second group of components to obtain the hooking of the carrier bag to the tank. On the flexible ring there is a hand-driven mechanism for the radial retraction of the locking teeth to generate a radial displacement of such locking teeth, allowing disengagement between the flexible ring and the annular flange and, hence, obtaining the disengagement of the carrier bag from the tank.

13 Claims, 8 Drawing Sheets

FIXING SYSTEM FOR CARRIER BAGS FOR MOTORCYCLES

This is a national stage of PCT/IB11/000233 filed Feb. 7, 2011 and published in English, which has a priority of Italian no. MI2010A000199 filed Feb. 10, 2010, hereby incorporated by reference.

The present invention refers to a system for hooking and unhooking carrier bags with respect to a fixed portion of a motorcycle, in particular the cap of the fuel tank of the motorcycle itself.

The use of bags or cases, suitable for housing various kinds of objects, on motorcycles in general, is well known. Such bags are usually applied in the rear part of the motorcycle, although the use of carrier bags to be applied above the fuel tank of the motorcycle itself is also common. These carrier bags are usually anchored to the motorcycle through adjustable straps, possibly elastic, which wrap around the tank and that are usually hooked to the steering column of the motorcycle itself. One drawback of this type of carrier bags is however related to the relative difficulty of application and removal thereof, together with the fact that the contact between the straps and the surface of the tank and/or of other components of the motorcycle can lead to scratching and abrasion of the paint.

In the case in which the motorcycle is provided with a fairing that surrounds the tank, making it extremely difficult, if not impossible, to wrap the tank itself through the straps, it is possible to apply carrier bags equipped with magnetic elements or elements with suction pads to be connected to the tank. During particular manoeuvres of the motorcycle or while travelling at high speeds, the magnetic bags or bags with suction pads can however suffer displacements with respect to the position in which they were applied to the tank, causing unbalancing or even being able to detach from the motorcycle.

A further type of carrier bags thus foresees the direct hooking to the cap of the tank. Most motorcycles on the market are equipped with tanks with caps that are fixed to the tank unit by means of screws, the number of which can vary depending on the model. Suitable flanges have thus been made which, interposed between the cap of the tank and the carrier bag, make it possible to fix the latter through the same type of screws foreseen for the cap itself. This type of carrier bag, although ensuring greater safety and reliability in use, can also however be difficult to apply and to remove with respect to the tank of the motorcycle.

The purpose of the present invention is therefore that of making a system for hooking and unhooking carrier bags, which can in particular be applied to the cap of the fuel tank of a motorcycle, which is capable of solving the aforementioned drawbacks of the prior art in an extremely simple, cost-effective and particularly functional manner.

In detail, one purpose of the invention is to make a system for hooking and unhooking carrier bags to the tank of a motorcycle that is simple and intuitive to use, making it possible to apply and remove the bag rapidly according to the requirements.

Another purpose of the invention is that of making a system for hooking and unhooking carrier bags to the tank of a motorcycle that makes the coupling between the bag and the tank stable and safe.

A further purpose of the invention is that of making a system for hooking and unhooking carrier bags to the tank of a motorcycle that avoids any type of damage to the tank or to other parts of the motorcycle due to the application of the bag.

These purposes according to the present invention are achieved by making a system for hooking and unhooking carrier bags to the tank of a motorcycle as outlined in claim 1.

Further characteristics of the invention are highlighted in the dependent claims, which are an integral part of the present description.

The characteristics and the advantages of a system for hooking and unhooking carrier bags to the tank of a motorcycle according to the present invention shall become clearer from the following description, given as an example and not for limiting purposes, with reference to the attached schematic drawings in which.

Figure 1:
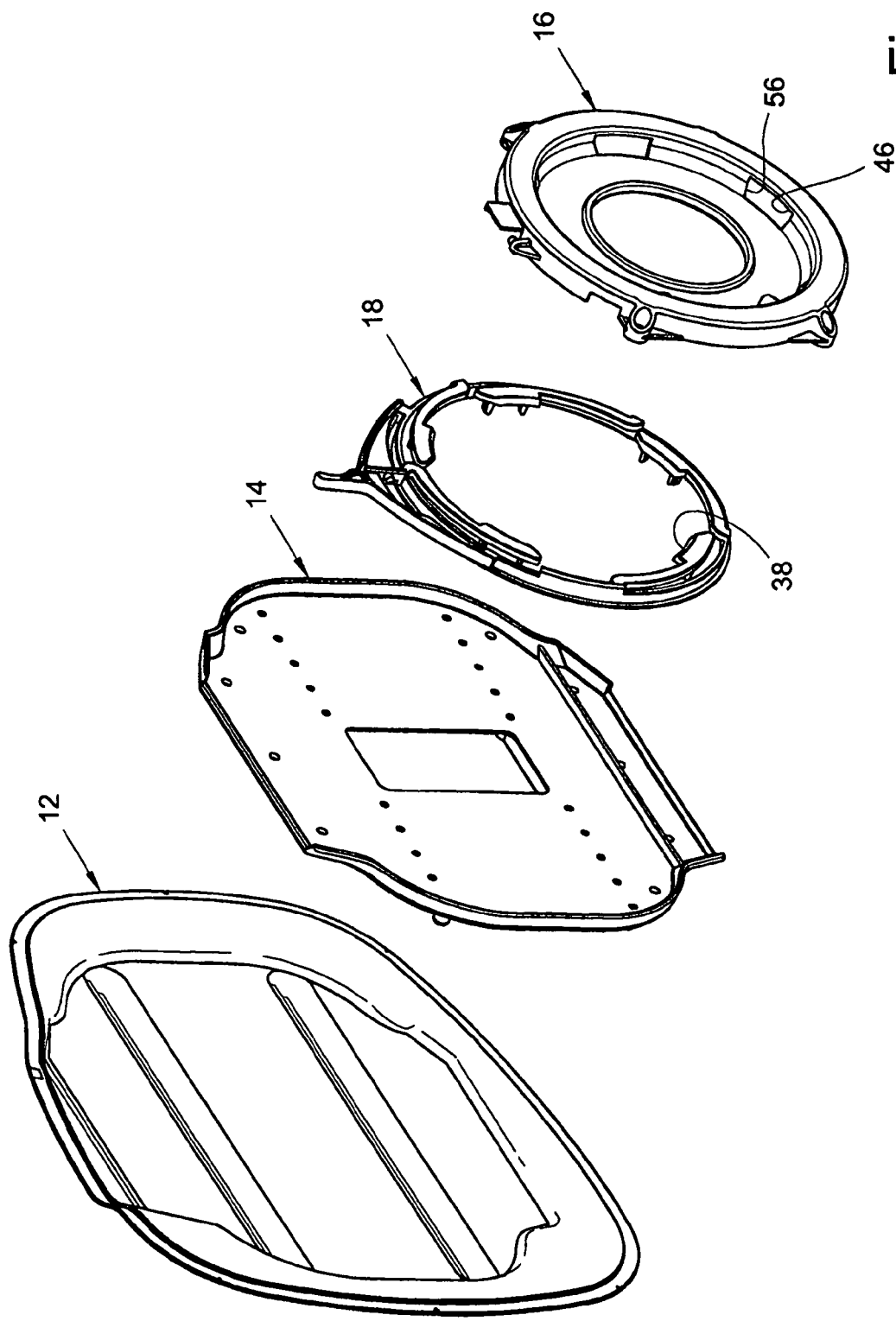
FIG. 1 is an exploded view of a first group of components that are part of the system for hooking and unhooking carrier bags to the tank of a motorcycle according to the present invention.

With reference to the figures, the components that are part of a system for hooking and unhooking a carrier bag 10 to a fixed portion of a motorcycle, in particular to the cap of the fuel tank 100 of the motorcycle itself are shown.

The system for hooking and unhooking the carrier bag 10 comprises a first group of components suitable to be fixed to the bag 10 itself. Such a first group of components in turn comprises a plate 14, made from plastic material, and a flexible ring 18, fixedly connected to such a plate 14 by interposing an annular connection element 16, also fixedly connected to such a plate 14. The flexible ring 18 is free to rotate with respect to the annular connection element 16.

The system for hooking and unhooking the carrier bag 10 also comprises a second group of components suitable to be fixed to the tank 100 of the motorcycle. Such a second group of components in turn comprises an annular flange 20, on which the flexible ring 18 of the first group of components of the fixing system can be hooked, and a disc 22, preferably made from metal, for fixing such a flange 20 to the cap of the tank 100.

Figure 3:
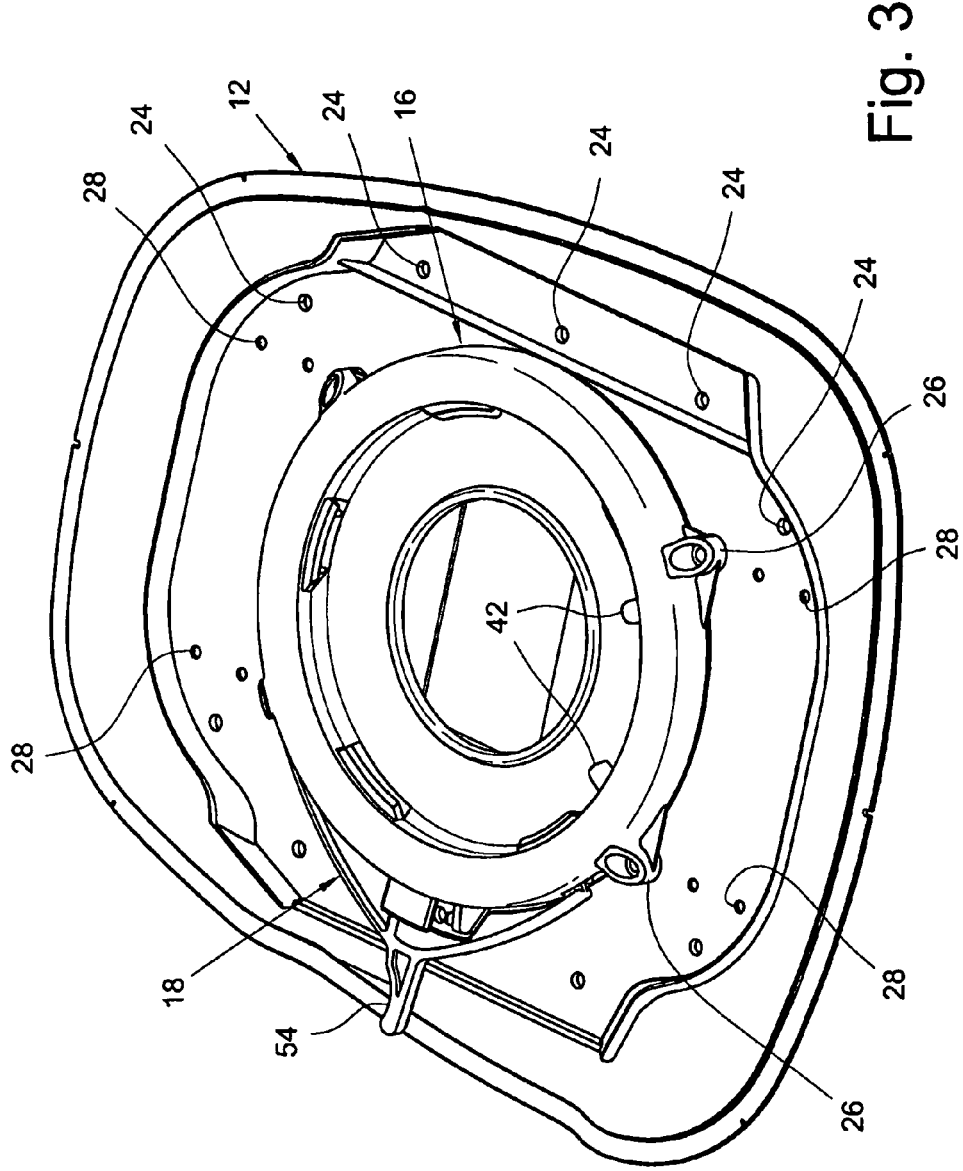
FIG. 3 is a perspective view of the group of components of FIG. 2, in its assembled configuration.
Figure 4:
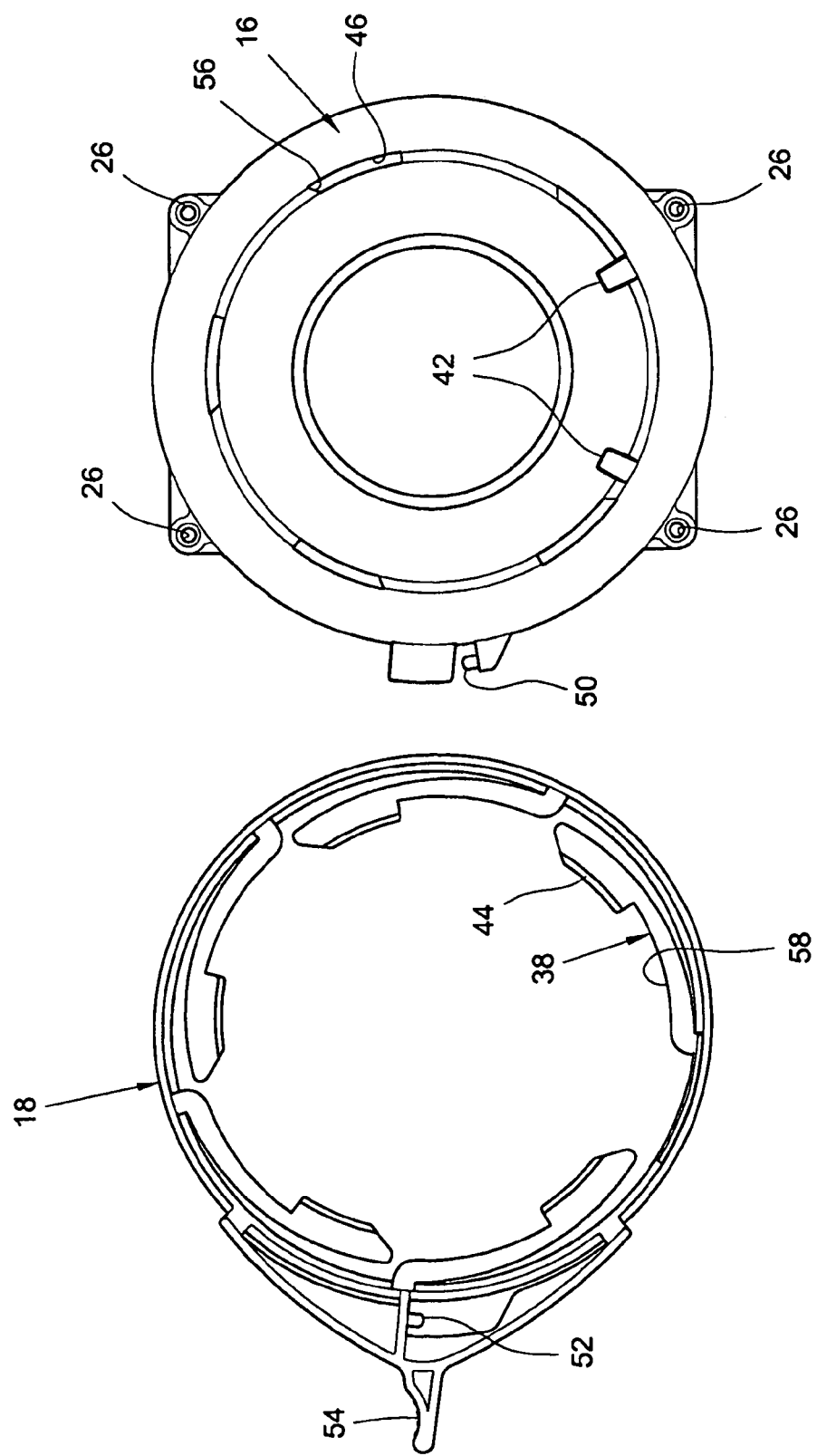
FIG. 4 is a detail view of two of the components shown in FIG. 1.
Figure 5:
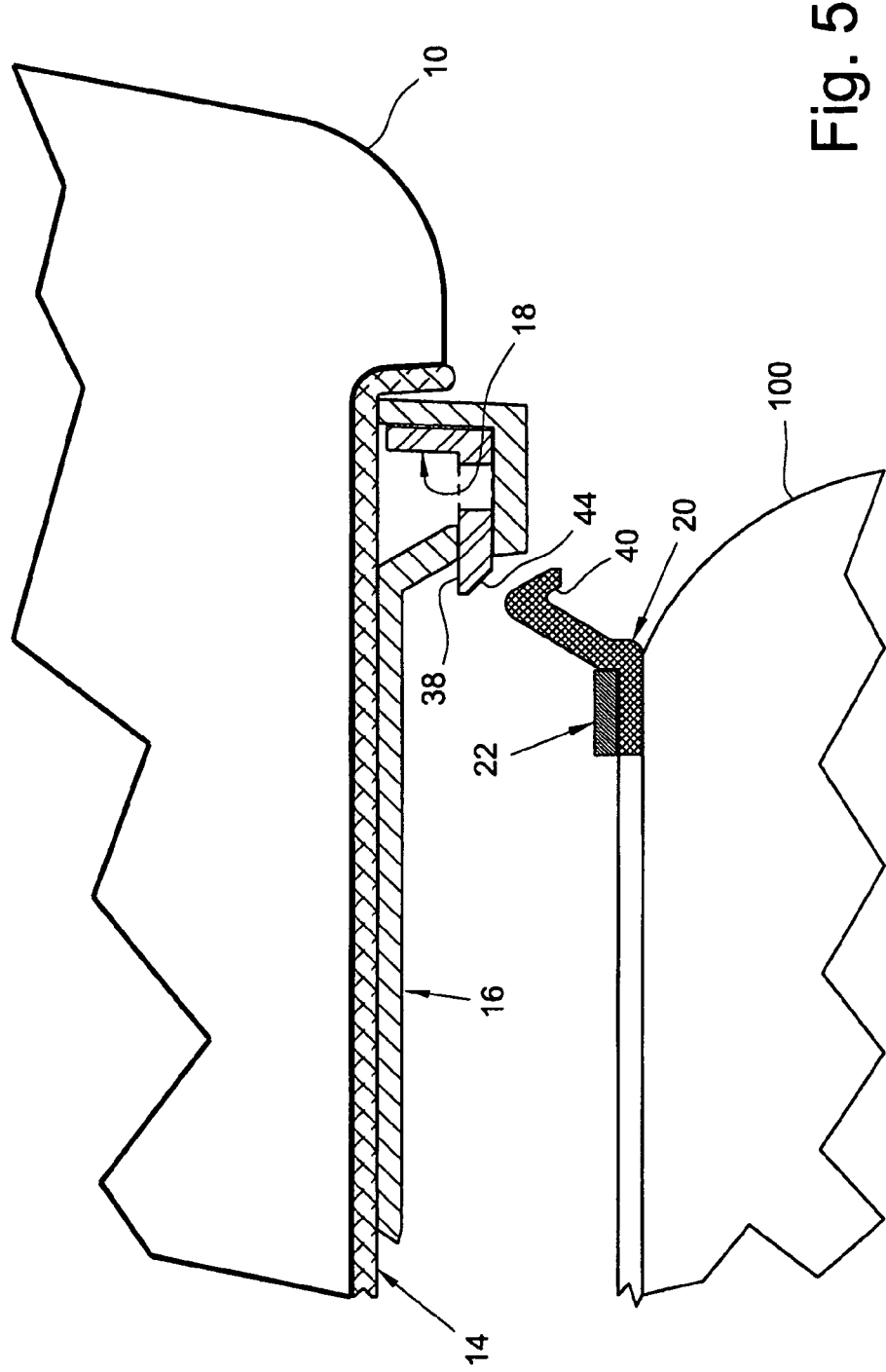
FIGS. 5 to 7 are schematic views illustrating the hooking steps of the carrier bag based upon the system according to the invention.

In detail, the carrier bag 10 is of the type provided with a base portion 12, preformed in the production step of the bag 10 itself and suitable to be fixedly connected to the plate 14 by means of screws or rivets that can be applied through a first series of through holes 24 formed on such a plate 14. The flexible ring 18 is snap mounted inside the annular connection element 16 and the assembly thus obtained is fixed to the plate 14, and thus to the bag 10, through a plurality of screws passing through corresponding seats 26 obtained on the annular connection element 16 and screwable inside a second series of through holes 28 formed on the plate 14. The presence of many through holes 28, which act as seats for fixing the annular connection element 16 and the relative flexible ring 18, makes it possible to obtain a plurality of distinct fixing positions for such an annular connection element 16, like for example the five possible positions allowed by the embodiment shown in FIG. 3. In such a way it is possible to optimise the position of the carrier bag 10 on the tank 100 according to the specific requirements.

The second group of components of the fixing system according to the invention is suitable to be fixed to a tank 100 of the type provided with a cap fixed to the tank unit by means of screws. The number of these screws can vary depending on the model of the motorcycle. In order to carry out the fixing of such a second group of components to the tank 100 of the motorcycle it is necessary to pre-emptively apply the flange 20 to the cap of the tank 100. In order to carry out this operation it is necessary to remove the original screws of the cap of the tank 100, rest the flange 20 on the cap, placing the metallic disc 22 above the flange 20, and then fix all to the cap itself again with the original screws, or with screws 30 having the same profile and different length.

Figure 2:
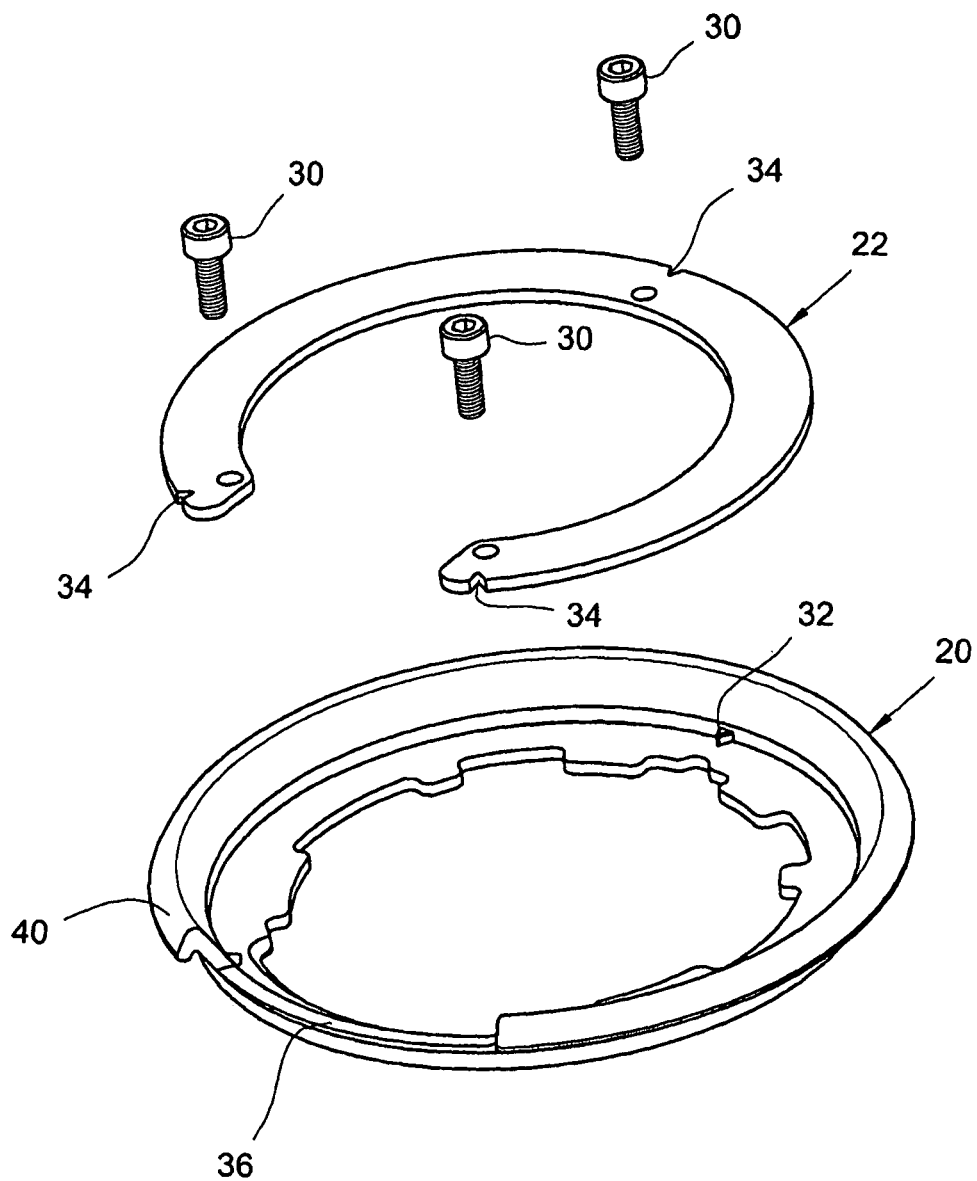
FIG. 2 is an exploded view of a second group of components that are part of the system for hooking and unhooking carrier bags to the tank of a motorcycle according to the present invention.

The metallic disc 22, having to be specifically made for each brand and/or model of motorcycle, is advantageously manufactured through laser cutting technology, so as to not require specific equipment to make it. In order to make the assembly of the second group of components, of the fixing system according to the invention, to the tank 100 simple and precise, indexes 32 (FIG. 2) have been formed on the flange 20, said indexes 32 being univocally coupled with some counter-indexes 34 obtained in form of graduation marks on the disc 22. The flange 20 can also be provided, at its rear part, with a cavity 36 that allows the cap of the tank 100 to open for refuelling even with the flange 20 mounted on it.

Once the flange 20 has been fixed to the tank 100 in the aforementioned manner, it is possible to hook the bag 10 by vertically snapping the annular connection element 16 above the flange 20 itself. The bag 10 can be fixed to the tank 100 based upon a single predetermined position, since on the annular connection element 16 there is a pair of ribs 42 that couple with the cavity 36 of the flange 20 according to a single coupling mode. The unintentional rotation of the bag 10 with respect to the tank 100 is thus prevented in the operational configuration of the fixing system.

The flexible ring 18 is provided with a plurality of locking teeth 38 elastically projecting inwards of the flexible ring 18 itself. In particular, each locking tooth 38 is obtained at the end part of a flexible arm 58 made integral to the inner circumferential surface of the flexible ring 18. The locking teeth 38 are thus suitable to engage with a corresponding protrusion 40 formed on the flange 20, preferably integral with it, which extends circumferentially outwards.

Figure 6:
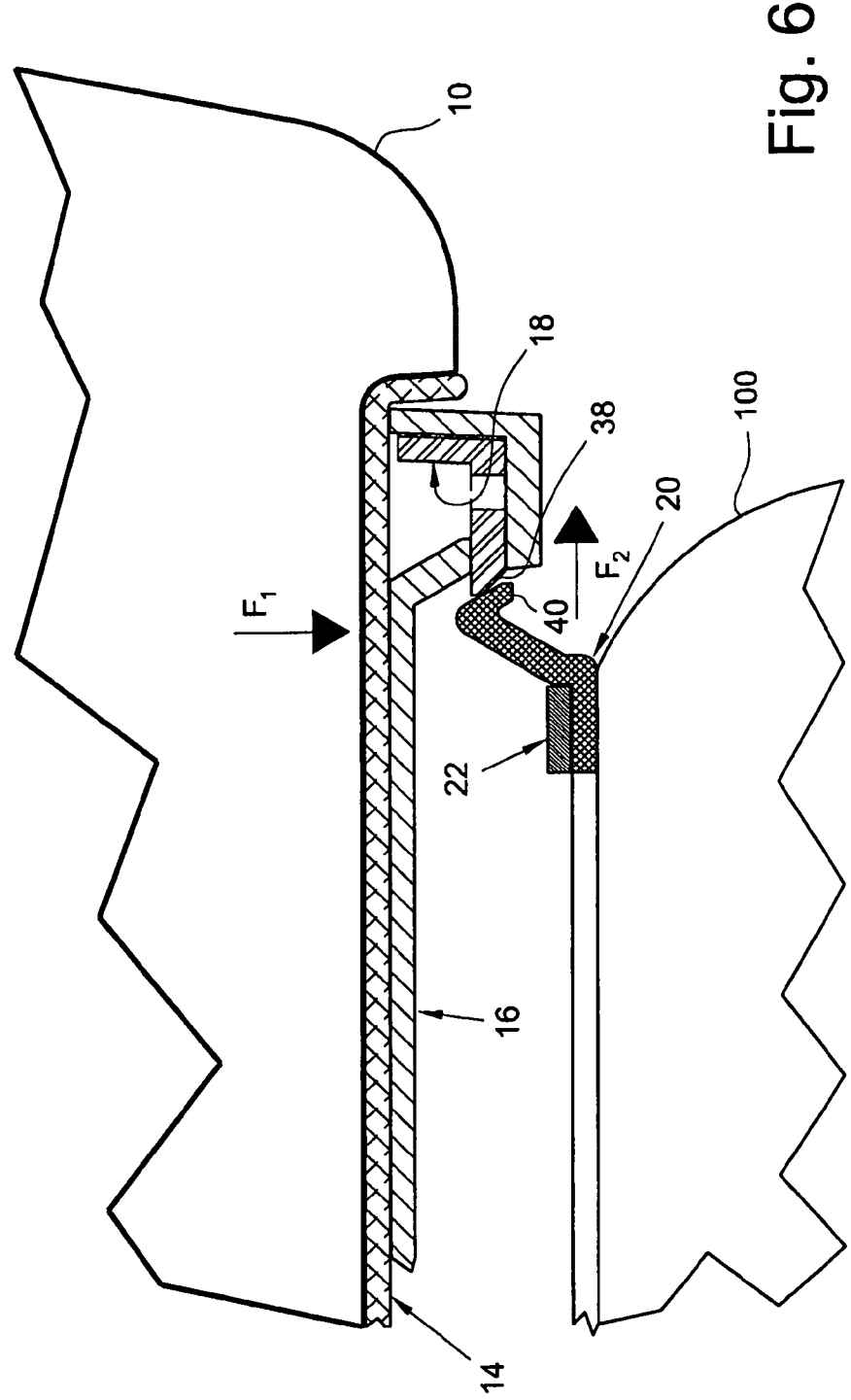
Figure 7:
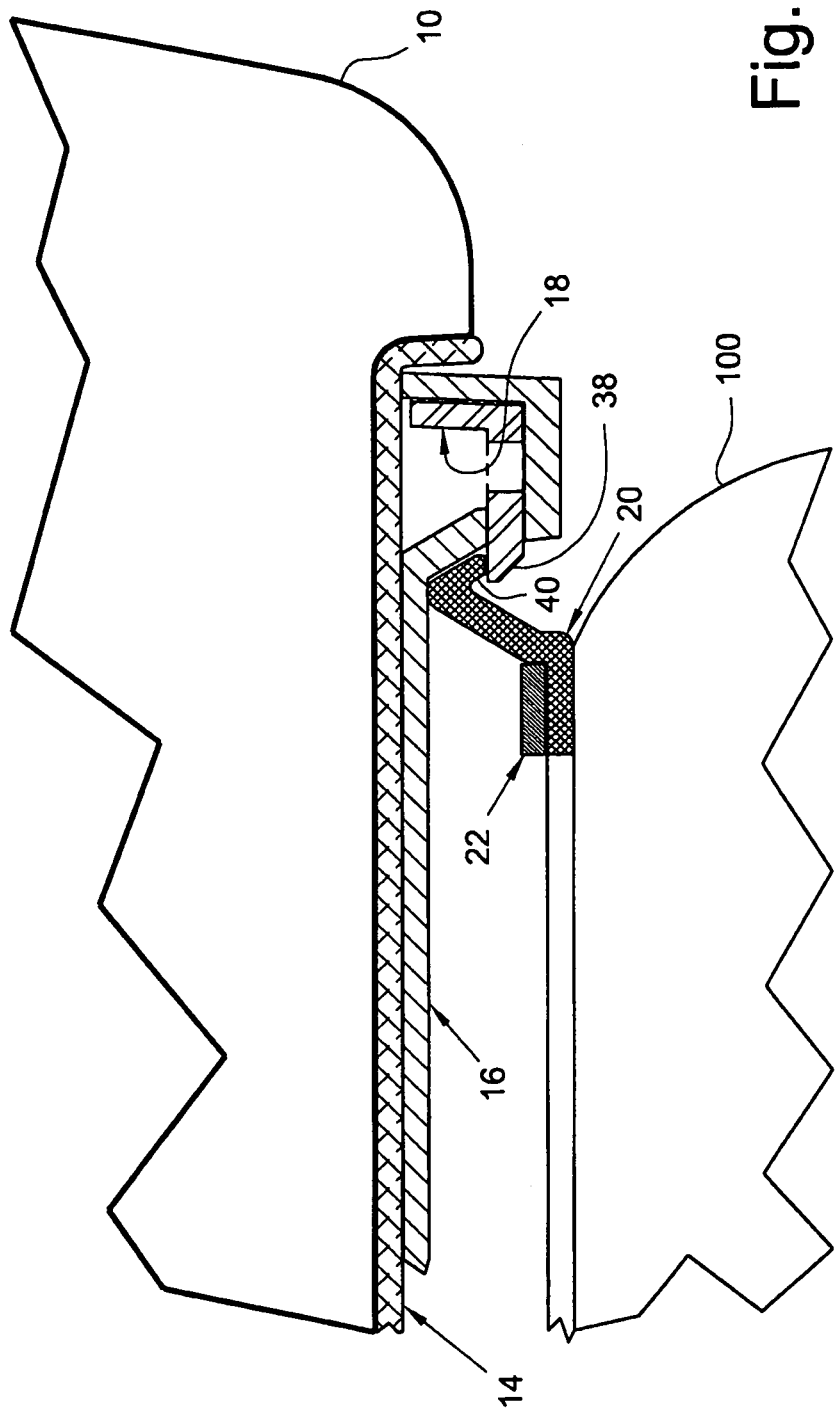

The actual hooking of the bag 10 is obtained since, when the flexible ring 18 is placed over the flange 20 in the direction indicated by the arrow $F_1$ of FIG. 6, the protrusion 40 formed on the outer edge of such a flange 20 is engaged with an inclined surface 44 foreseen on the lower end surface of each locking tooth 38 of such a flexible ring 18. In such a way the locking teeth 38 slide outwards, in the direction indicated by the arrow $F_2$ of FIG. 6, inside corresponding slots 46 obtained on the circumferential edge of the annular connection element 16, until they pass the protrusion 40 and have returned to their original position (FIG. 7). The movement of the flexible ring 18 along a vertical axis is thus prevented, hence ensuring the hooking of the bag 10 to the tank 100.

Figure 8:
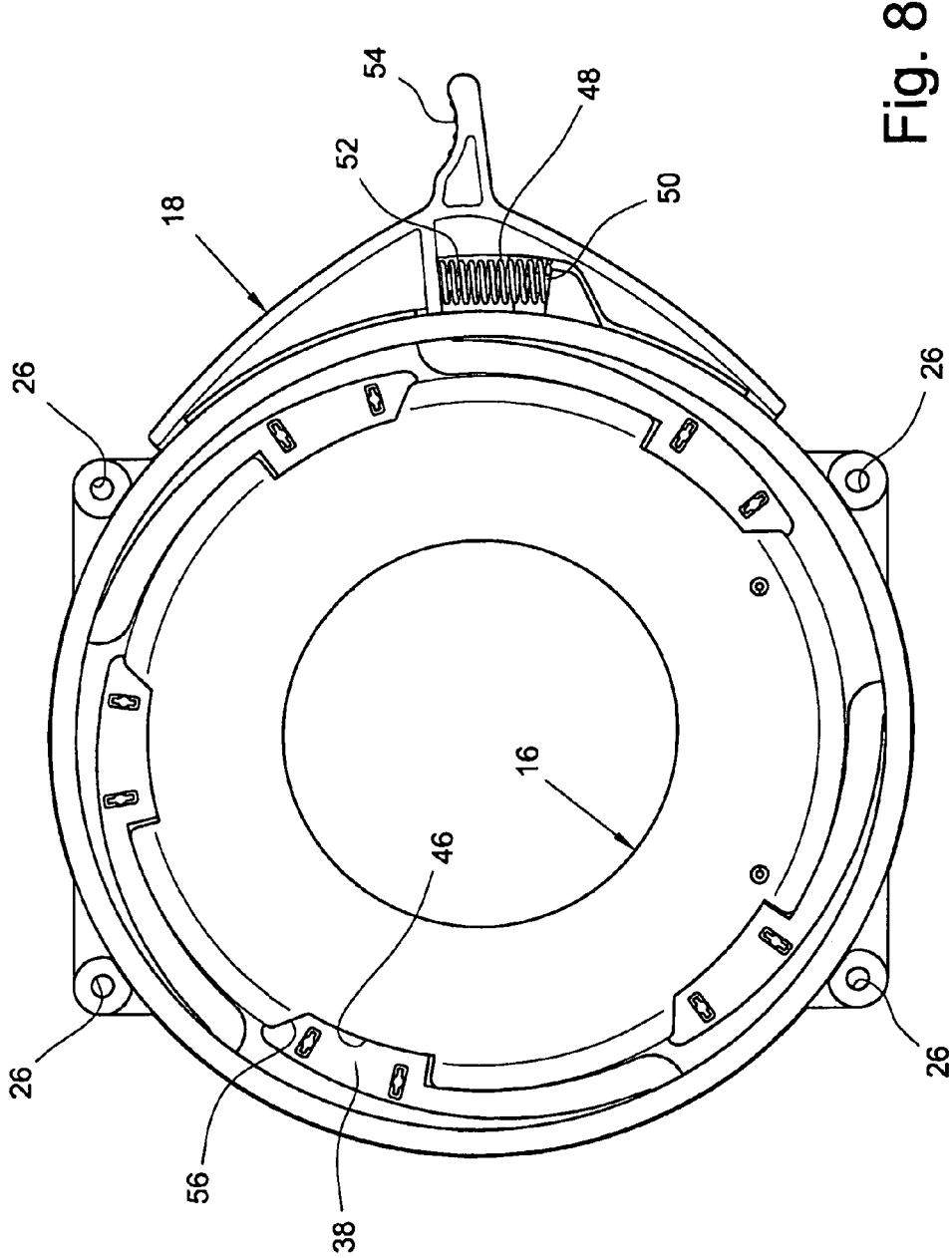
FIG. 8 is a plan view of the two components of FIG. 4, shown in the unhooking step of the carrier bag.

In order to ensure that it is not just the elasticity of the plastic material, from which the flexible ring 18 is made, that keeps the teeth 38 in operating position, a spring 48 can advantageously be foreseen (FIG. 8) which operates by compression between a first pin 50, formed on the annular connection element 16, and a second pin 52, formed on such a flexible ring 18.

In the specific embodiment illustrated, five locking teeth 38 are provided on the flexible ring 18, as well as five corresponding slots 46 are provided on the annular connection element 16. It should be clear however, that the number and the dimensions of the locking teeth 38 and of their corresponding slots 46 can vary, by increasing or decreasing them according to the constructive requirements.

In order to detach the bag 10 from the tank 100 a hand-driven mechanism is foreseen for radial re-traction of the locking teeth 38. In the detail, on the circumferential surface of the flexible ring 18 a grip 54 is formed (FIG. 8) that, when manually actuated, compresses the spring 48 (when present) and generates the radial displacement of the locking teeth 38 that, by rotating, strike against an inclined lateral wall 56 of the slots 46 of the annular connection element 16. In such a way, the locking teeth 38 are forced to enter back into the slots 46, decoupling the first from the second group of components of the fixing system according to the invention and, hence, the bag 10 from the tank 100, thus allowing the bag 10 itself to be removed from the motorcycle.

It has thus been seen that the system for hooking and unhooking carrier bags to the tank of a motorcycle according to the present invention achieves the previously highlighted purposes.

The system for hooking and unhooking carrier bags to the tank of a motorcycle of the present invention thus conceived can in any case undergo numerous modifications and variants, all covered by the same inventive concept; moreover, all the details can be replaced by technically equivalent elements. In practice the materials used, as well as the shapes and sizes, can be any according to the technical requirements.

The scope of protection of the invention is thus defined by the attached claims.

The invention claimed is:

1. A carrier bag provided with a system for hooking and unhooking said carrier bag with respect to the tank of a motorcycle, the system comprising a first group of components suitable to be fixed to the carrier bag and a second group of components suitable to be fixed to the tank, characterised in that said first group of components comprises a flexible ring provided with a plurality of locking teeth elastically projecting inwards of said flexible ring, said locking teeth coupling with an annular flange of said second group of components to obtain the hooking of the carrier bag to the tank, a hand-driven mechanism for radial retraction of said locking teeth being provided for on the flexible ring to generate a radial displacement of said locking teeth, allowing disengagement between said flexible ring and said annular flange and, hence, obtaining the disengagement of the carrier bag from the tank; and further characterised in that said first group of components comprises a plate, constrainable to the carrier bag, and that said flexible ring is constrained to said plate by interposing an annular connection element, said flexible ring being free to rotate with respect to said annular connection element.

2. The carrier bag according to claim 1, characterised in that each locking tooth is obtained at the end part of a flexible arm made integral to the inner circumferential surface of said flexible ring.

3. The carrier bag according to claim 2, characterised in that said locking teeth are coupled with a corresponding protrusion, made integral to said annular flange and which extends circumferentially outwards.

4. The carrier bag according to claim 3, characterised in that each locking tooth is provided, on its lower end surface, with an inclined surface capable of coupling with said protrusion.

5. The carrier bag according to claim 4, characterised in that each locking tooth is capable of sliding outwards into a corresponding slot, obtained on the circumferential edge of said annular connection element, to be coupled with said protrusion.

6. The carrier bag according to claim 5, characterised in that each slot is provided with an inclined lateral wall against which each locking tooth, rotating upon the actuation of said radial retraction hand-driven mechanism, abuts to enter into the slots, thus releasing the coupling between said first and said second group of components.

7. The carrier bag according to claim 1, characterised in that the system comprises a spring which operates by compression between a first pin, obtained on said annular connection element, and a second pin, obtained on said flexible ring, in such a manner that maintaining said locking teeth at operational position is not solely obtained by virtue of the elasticity of the material by means of which said flexible ring is made.

8. The carrier bag according to claim 1, characterised in that said plate is suitable for being constrained to a base portion of the carrier bag through fixing means applicable through a first series of through holes obtained on said plate.

9. The carrier bag according to claim 8, characterised in that said flexible ring is snap-mounted in said annular connection element, the assembly thus obtained being fixed to said plate through a plurality of screws passing through corresponding seats obtained on said annular connection element and screwable in a second series of through holes obtained on said plate.

10. The carrier bag according to claim 1, characterised in that said second group of components comprises a disc for fixing said annular flange to the cap of the tank by means of screws.

11. The carrier bag according to claim 10, characterised in that obtained on said annular flange one or more indexes are univocally coupled with one or more counter-indexes obtained in form of graduation marks on said disc.

12. The carrier bag according to claim 10, characterised in that said annular flange is provided, at its rear part, with a cavity which allows opening the cap of the tank for refueling even with said flange mounted on the tank.

13. The carrier bag according to claim 12, characterised in that obtained on said annular connection element is a pair of ribs which are coupled with said cavity according to a single coupling mode, thus preventing unintentional rotation of the bag with respect to the tank in the operational configuration of the fixing system.

* * * * *